United States Patent [19]
Zwanikken et al.

[11] Patent Number: 5,595,066
[45] Date of Patent: Jan. 21, 1997

[54] METHOD AND DEVICE FOR PRESERVING THE MEAT OF A SLAUGHTERED BIRD

[75] Inventors: Radboud H. G. Zwanikken, Boxmeer; Jenneke A. C. Lankhaar, Bokhoven; Adrianus J. van den Nieuwelaar, Gemert, all of Netherlands

[73] Assignee: Stork PMT B.V., Netherlands

[21] Appl. No.: 371,825

[22] Filed: Jan. 12, 1995

[30] Foreign Application Priority Data

Jan. 13, 1994 [NL] Netherlands ............... 9400060

[51] Int. Cl.⁶ .................................................. F25D 17/02
[52] U.S. Cl. .................. 62/374; 62/65; 426/524
[58] Field of Search ................... 62/63, 374, 65; 426/524

[56] References Cited

U.S. PATENT DOCUMENTS

| | | | |
|---|---|---|---|
| 2,528,079 | 10/1950 | Reiman et al. | 99/194 |
| 2,544,724 | 3/1951 | Rentschler | 99/107 |
| 3,715,891 | 2/1973 | Martin . | |
| 3,729,773 | 5/1973 | Dillon . | |
| 3,814,814 | 6/1974 | Wallace . | |
| 3,828,396 | 8/1974 | Wernberg . | |
| 4,199,958 | 4/1980 | Masuda et al. . | |
| 4,271,683 | 6/1981 | Williams . | |
| 4,319,460 | 3/1982 | Williams . | |
| 4,367,630 | 1/1983 | Bernard et al. . | |

FOREIGN PATENT DOCUMENTS

| | | |
|---|---|---|
| 0046325 | 2/1982 | European Pat. Off. . |
| 0434278 | 6/1991 | European Pat. Off. . |
| 2135634 | 12/1972 | France . |
| 2164870 | 6/1972 | Germany . |
| 7709248 | 3/1978 | Netherlands . |
| 7809801 | 2/1979 | Netherlands . |
| 8004262 | 1/1981 | Netherlands . |
| 8800567 | 2/1989 | Netherlands . |

OTHER PUBLICATIONS

6001 Chemical Abstracts; vol. 97 (1982) Sep. No. 13, Columbus, Ohio, USA.
C. H. Veerkamp en G. J. P. Hofmans, Koeltechnick 70 (1977) nr 6 (juni).
Charles H. Veerkamp, "Can Evaporative Air–Chilling Control Weight Loss in Cooling?" Misset–World Poultry vol. 7, No. 6, 1991, pp. 37–39.
Charles H. Veerkamp, "Control of Weightloss by Evaporative Air Chilling", Spelderholt Centre for Poultry Research.

Primary Examiner—Ronald C. Capossela
Attorney, Agent, or Firm—John S. Pratt; Kilpatrick & Cody, L.L.P.

[57] ABSTRACT

Method and device for preserving the meat of a slaughtered bird or a part thereof, in which the bird or the part thereof is firstly cooled in a short time until the core temperature of the meat is lower than the temperature at which heat-shortening occurs at the prevailing acidity; and next the bird or the part thereof is cooled further, in the course of which the core temperature of the heat remains higher than the temperature at which cold-shortening occurs at the prevailing acidity. During the cooling steps the surface is cooled to such a temperature that the germ counts or decay-causing and pathogenic micro-organisms remain below a predetermined value.

17 Claims, 1 Drawing Sheet

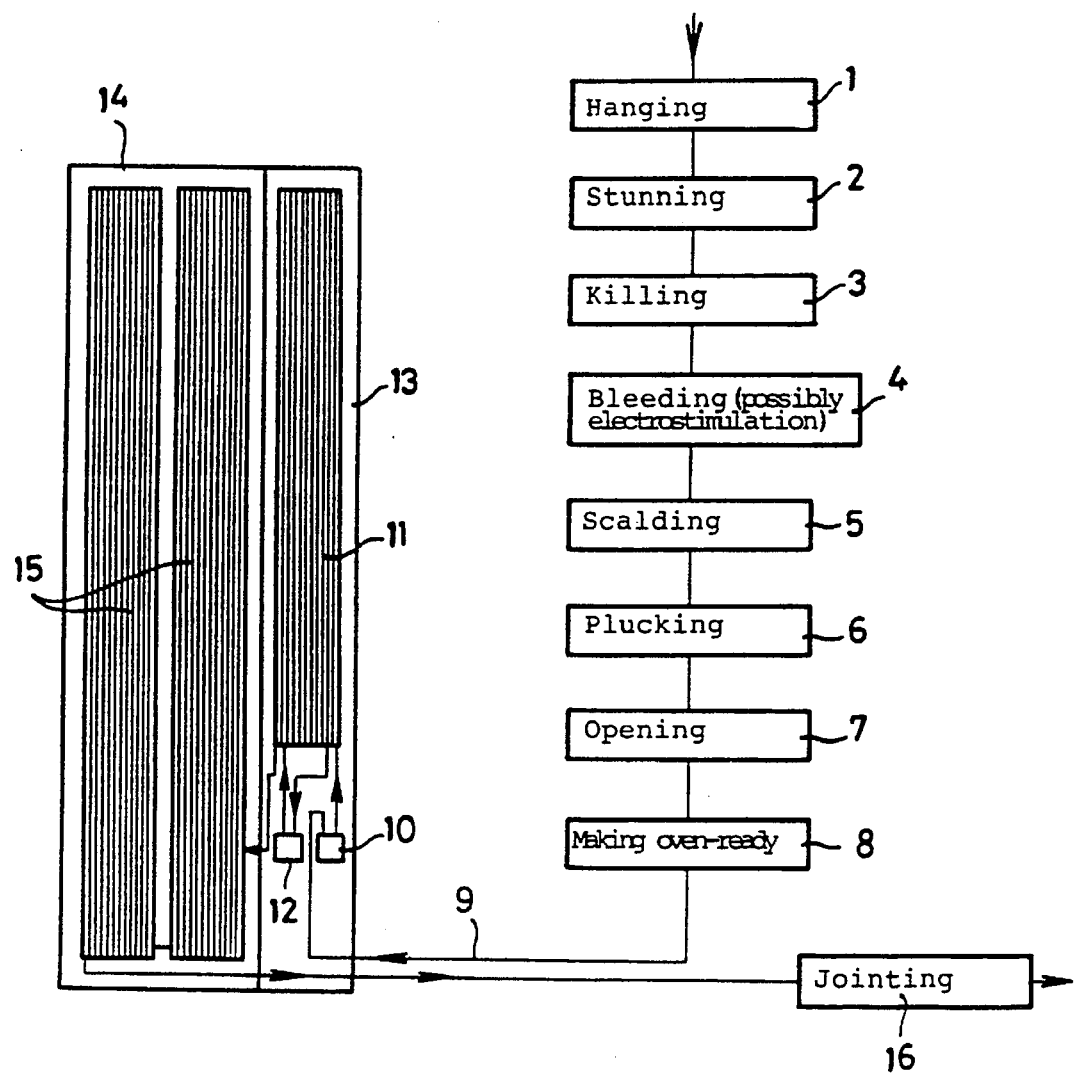

METHOD AND DEVICE FOR PRESERVING THE MEAT OF A SLAUGHTERED BIRD

BACKGROUND OF THE INVENTION

This invention relates to a method and device for preserving the meat of a slaughtered bird or a part thereof.

DISCUSSION OF THE PRIOR ART

Birds intended for slaughter, after being slaughtered and where appropriate plucked and eviscerated, are cooled as a whole or in parts, in order to preserve the meat. For this purpose, many kinds of methods are known in the prior art, such as cooling with air at a high relative humidity, in order to avoid drying-out of the meat, evaporation cooling, immersion cooling etc. In the past, great attention was paid to special methods of cooling for maintaining good microbiological quality, a long shelf life and a good colour of the meat.

Another important aspect of the meat quality is that it should be sufficiently tender, which is traditionally achieved by first pre-cooling the meat and then leaving it to hang for a long period of, say, 24 hours in a cooled room. The hanging process prevents the occurrence of undesirable muscle contractions following the jointing of the slaughtered bird, when the muscles are no longer held by the bones and sinews of the bird.

With the usual method of cooling, such as that described in, for example, Dutch Patent Application 8800567, the processing conditions are not optimum for achieving sufficient tenderness in the meat.

A great disadvantage of the prior art is the very large buffer cooling room required for the hanging process, on account of the large slaughter capacity of modern slaughterhouses.

Another disadvantage in the prior art is the great loss of time caused by the hanging process after slaughter before the meat product can be put on the market, which means that the shelf life on the market is shortened.

SUMMARY OF THE INVENTION

The object of the invention is to provide a method for preserving the meat of a slaughtered bird or a part thereof, by means of which method the desired tenderness of the meat, with retention of good microbiological quality in the meat, can be achieved considerably more quickly than in the current situation.

This object is obtained with the method according to the invention which is characterized by the following successive steps: (1) cooling of the slaughtered bird or the part thereof in a short time until the core temperature of the meat is lower than the temperature at which heat-shortening occurs; and (2) slow cooling of the slaughtered bird or the part thereof, in the course of which the core temperature of the meat remains higher than the temperature at which cold-shortening occurs; during which first and second cooling steps the surface of the bird or part thereof is cooled to such a temperature that the germ counts of the decay-causing and pathogenic micro-organisms remain below a predetermined value. In this connection, heat-shortening should be understood as meaning a contraction of muscle tissue which occurs at a particular acidity if a high post-mortem temperature is maintained for a fairly long time. Heat-shortening is caused by a disturbance of the normal enzyme action in the muscle tissue, as a result of which the energy conversion therein occurs in an uncontrolled manner. Cold-shortening should be understood as meaning a contraction of muscles which occurs if the meat is cooled too rapidly to below a temperature which depends on the type, mass and acidity of the meat of the slaughtered bird. For freshly slaughtered poultry the abovementioned temperature is approximately 10° to 12° C. The term core temperature relates to the average temperature at some distance below the surface in the largest part of the slaughtered bird or the part thereof.

In the first cooling step of the method according to the invention, muscles are prevented as far as possible from contracting. Such an undesirable contraction, which causes the meat to be very tough, probably occurs due to an increase in the concentration of $Ca^{2+}$ ions in the cell membranes in the muscle cells.

In the second cooling step of the method according to the invention also, an undesirable muscle contraction is effectively prevented through taking sufficient cooling time for a fall in the acidity of the meat to below a critical value.

With the method according to the invention, a particularly tender product can be obtained in a relatively short time, in which product no contraction phenomena of any kind occur during and after the cooling process and after boning. This means that the slaughtered bird or a part thereof can be cooled directly in the processing line and needs not be hung in a buffer storage room for a long time.

In a preferred embodiment of the method the first cooling step is carried out by moistening the slaughtered bird and placing it in a cold air stream until the core temperature of the meat is lower than 35° C., which first cooling step takes at most about three quarters of an hour for avoiding the occurrence of heat-shortening. The moistening can be continuous or intermittent, as can the application of the cold air stream. In general, the moistening and the application of the cold air stream will follow one another in time and will be repeated once or several times if necessary. In this way the heating and evaporation of the water are used for very efficient heat extraction from the slaughtered bird or the part thereof.

The second cooling step of the method preferably takes at least about two hours and at most about five hours until the core temperature of the meat is lower than 10° C., for avoiding the occurrence of cold-shortening, e.g. by placing the slaughtered bird or part thereof in cold air or in a cold air stream of such relative humidity that, after the second step has been passed through, the surface is essentially dry. This ensures that the meat has the longest possible shelf life on the market, due to the absence of moisture on the surface thereof. In this step of the method the air temperature is preferably greater than approximately 0° C.

With the above times for performing the first and the second cooling step heat-shortening and cold-shortening is prevented at any prevailing acidity of the meat.

In order to keep the numbers of decay-causing and pathogenic micro-organisms within acceptable limits, it is ensured that the temperature of the surface of the bird or part thereof is brought to a maximum of 15° C., in particular to a maximum of 12° C.

It was found from experiments that the effect of heat-shortening can be prevented in particular by cooling the slaughtered bird or the part thereof in a short time in such a way that, after the first cooling step of the method has been passed through, the core temperature of the meat is lower than 30° C., and particularly is lower than 25° C.

It also emerged from the experiments that the effect of cold-shortening can be prevented by carrying out the cooling in the second cooling step of the method in such a way that the core temperature of the meat thereafter is lower than 6° C.

In a preferred embodiment of the method an electrical voltage is applied to the slaughtered bird or the part thereof. Such a treatment, generally called electrostimulation, accelerates the biochemical processes occurring in the bird after death, and especially accelerates the fall in the acidity of the meat. In particular, this can produce a considerable further reduction in the time required for the second cooling step of the method. An electrical voltage is advantageously applied to the slaughtered bird during the first cooling step, between the first and the second cooling step and/or during the second cooling step of the method. Independently of the application of electrostimulation, or in combination therewith, the fall in the acidity in the tissue of the slaughtered bird can be promoted by killing the bird in an atmosphere which is high in carbon dioxide gas. As a result of this, the bird will inhale a relatively large quantity of carbon dioxide in its last phase of life, and this gas is spread by way of the lungs through the bird's body, and thus passes into the tissues, causing acidification thereof.

When used on turkeys, the first cooling step should take no more than about 0.5 hour, and the second cooling step no more than about 3.5 hours. For chickens, the first cooling step should take no more than about 0.5 hour, and the second cooling step no more than about 2 hours.

A device for carrying out the method according to the invention comprises conveyor means for conveying the slaughtered bird or a part thereof into, through and out of one or more cooling rooms, the one or more cooling rooms comprising a first cooling zone with a spraying device for spraying cold water on the bird or the part thereof, and means for producing a cold air stream directed at the bird or the part thereof, the device further comprising a second cooling zone containing cold air.

The cooling zones may be cooling rooms which are separated from each other, for carrying out the first and second cooling steps, respectively, of the method.

The claims and advantages will be more readily appreciated as the same becomes better understood by reference to the following detailed description and considered in connection with the accompanying drawing.

BRIEF DESCRIPTION OF THE DRAWING

The single FIGURE diagrammatically shows an embodiment of the device according to the invention in top view.

DESCRIPTION OF THE PREFERRED EMBODIMENT

One part of the FIGURE is in the form of a flow chart showing the series of operations which are normally performed in the slaughter of poultry. In a first step 1 the poultry is hung up in a poultry slaughterhouse, i.e. it is suspended by the legs from a hook of a conveyor. In subsequent steps 2 and 3 the poultry is stunned and killed by electrical or mechanical means, or by means of a suitable stunning gas, such as carbon dioxide gas. In a subsequent step 4 the carotid artery of the poultry is cut open, so that the bird can bleed. In addition, there can be electrostimulation in this phase of the slaughter process. In a subsequent step 5 the poultry is subjected to a scalding process, in order to prepare for step 6, which is plucking. A subsequent step 7 is opening of the carcass near the cloaca and evisceration ("making oven-ready") in a step 8. The poultry is then ready to undergo the preserving cooling treatment according to the invention, and is by means of a conveyor taken to a station 10 where it is sprayed with cold water, the track of the conveyor being indicated by reference number 9 in the FIGURE. Cold air is then blown in a meandering path 11 against the poultry, and the poultry may be sprayed again at various places with water. An additional spraying of the poultry can also be carried out in a separate station 12. A pre-cooling thus takes place in a room whose boundaries are indicated by means of a rectangle 13, during which operation the core temperature of the meat is reduced in a short time of at most about three quarters of an hour in such a way that heat-shortening is prevented, while the temperature of the surface of the slaughtered poultry is sufficiently low for maintaining good microbiological quality.

The poultry is then taken into a second room, whose boundaries are indicated by a rectangle 14. In the second room the poultry undergoes further, slow cooling for at least about two hours and at most about five hours, and for this purpose follows a meandering path 15 in the second room, in the course of which cold air of such relative humidity is blown against the poultry that the poultry leaves the second room with a dry surface. The conveying speed of the conveyor is adapted to the lengths of the conveying path in the first and the second room, by speed setting means not shown in further detail, to obtain the required cooling times in the first and the second room. In a subsequent step 16 of the slaughter process the poultry is jointed, following which it is processed to the desired products if necessary.

While the invention has been described and illustrated in its preferred embodiment, it should be understood that departures may me made therefrom within the scope of the invention, which is not limited to the details disclosed herein.

What is claimed is:

1. A device for preserving the meat of a slaughtered bird or a part thereof, comprising:

conveyor means for conveying the slaughtered bird or a part thereof along a path into, through and out of one or more cooling rooms, the one or more cooling rooms comprising a first cooling zone with a spraying device for spraying cold water on the bird or the part thereof, and means for producing a cold air stream directed at the bird or part thereof, the device further comprising a second cooling zone containing cold air of sufficiently low relative humidity that the surface of the bird or the part thereof is essentially dry after passing therethough.

2. A device according to claim 1, the conveying path having a predetermined length in said first and second cooling zones, and comprising means for setting a conveyance speed of the conveyor means for conveying the slaughtered bird or the part thereof, taking into account said predetermined length, along said path in the first cooling zone for at most about three quarters of an hour, and along said path in the second cooling zone at least about two hours and at most about five hours.

3. A device according to claim 1, wherein the second cooling zone is provided with means for producing a cold air stream directed at the bird or the part thereof.

4. A device according to claim 1, wherein the conveyor means conveys the slaughtered bird or a part thereof along a path through and out of two cooling rooms.

5. A device according to claim 1, wherein only a part of the track in the first cooling zone runs through a spraying station for spraying cold water on the bird or the part thereof.

6. A device for preserving the meat of a slaughtered bird or a part thereof, comprising a conveyor for moving the slaughtered bird or a part thereof along a path into, through and out of a first cooling zone and a second cooling zone, (a) the first cooling zone including a first means for cooling the bird or the part thereof, and (b) the second cooling zone including a second means for cooling the bird or the part thereof and drying the surface of the bird or the part thereof.

7. The device for preserving the meat of a slaughtered bird or a part thereof of claim 6, wherein:

(a) the first cooling means comprises a means for directing water and air against the bird or the part thereof, and (b) the second cooling means comprises a means for directing air against the bird or the part thereof.

8. The device for preserving the meat of a slaughtered bird or a part thereof of claim 6, wherein:

(a) the first cooling means comprises a means for directing water and air against the bird or the part thereof, and (b) the second cooling means comprises a means for directing against the bird or the part thereof air of sufficiently low relative humidity that the surface of the bird or the part thereof is essentially dry after passing therethrough.

9. The device for preserving the meat of a slaughtered bird or a part thereof of claim 6, wherein:

(a) the first cooling means comprises a means for directing water and air against the bird or the part thereof, (b) the second means comprises a means for directing air against the bird or the part thereof, and (c) only a part of the track in the first cooling zone runs through a spraying station for spraying cold water on the bird or the part thereof.

10. A device for preserving the meat of a slaughtered bird or part thereof, comprising:

a conveyor for moving the bird or a part thereof along a path into, through and out of a first cooling zone and a second cooling zone, the first cooling zone comprising a first means for cooling by directing water and air against the bird or the part thereof to reduce the core temperature of the meat to a temperature lower than the temperature at which heat-shortening occurs, and the second cooling zone comprising a second means for cooling the bird or the part thereof by directing air against the bird or a part thereof while maintaining the core temperature of the meat at a temperature higher than the temperature at which cold-shortening occurs.

11. The device for preserving the meat of a slaughtered bird or a part thereof of claim 10, wherein the second cooling means further comprises a means for drying the surface of the bird or the part thereof.

12. A device according to claim 10, wherein only a part of the track in the first cooling zone runs through a spraying station for spraying cold water on the bird or the part thereof.

13. A device for preserving the meat of a slaughtered bird or a part thereof, comprising:

(a) a first processing means for cooling the bird or the part thereof to a core temperature lower than 35° C. within at most about three quarters of an hour, and (b) a second processing means for cooling the bird or the part thereof to a core temperature lower than 10° C. during a period of at least about two hours and at most about five hours.

14. A device for preserving the meat of a slaughtered bird or a part thereof, comprising:

(a) a first processing means for cooling the bird or the part thereof to a core temperature lower than 35° C. within at most about three quarters of an hour, and (b) a second processing means for simultaneously:

(1) cooling the bird or the part thereof to a core temperature lower than 10° C. during a period of at least about two hours and at most about five hours and (2) removing moisture from the surface of the bird or the part thereof until the surface is essentially dry.

15. A device for preserving the meat of a slaughtered bird or a part thereof, comprising:

(a) conveyor means for conveying the slaughtered bird or the part thereof along a conveying path into, through and out of one or more cooling rooms, the one or more cooling rooms comprising:

(1) a first cooling zone with a spraying device for spraying cold water on the bird or the part thereof, and a means for producing a cold air stream directed at the bird or part thereof, and (2) a second cooling zone, the conveying path having a predetermined length in said first and second conveyance cooling zones, and (b) a means for setting a conveyance speed of the conveyor means for conveying the slaughtered bird or the part thereof, taking into account said predetermined length, along said path in the first cooling zone for at most about three quarters of an hour, and along said path in the second cooling zone at least about two hours and at most about five hours.

16. A device according to claim 15, wherein the second cooling zone is provided with a means for producing a cold air stream directed at the bird or the part thereof.

17. A device according to claim 15, wherein only a part of the track in the first cooling zone runs through a spraying station for spraying cold water on the bird or the part thereof.

* * * * *